US009183662B1

(12) United States Patent
Sams et al.

(10) Patent No.: US 9,183,662 B1
(45) Date of Patent: Nov. 10, 2015

(54) SYSTEM AND METHOD FOR ENABLING SCENE PROGRAM FUNCTIONALITY

(75) Inventors: Jason Sams, San Jose, CA (US); Cass W. Everitt, Heath, TX (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 2271 days.

(21) Appl. No.: 12/125,861

(22) Filed: May 22, 2008

(51) Int. Cl.
*G06T 1/00* (2006.01)
*G06T 15/00* (2011.01)
*G06T 17/00* (2006.01)

(52) U.S. Cl.
CPC ............... *G06T 15/00* (2013.01); *G06T 17/005* (2013.01); *G06T 2210/61* (2013.01)

(58) Field of Classification Search
CPC ... G06T 2210/61; G06T 17/005; G06T 15/00; G06T 19/00
USPC .................................. 345/522, 419, 505, 506
See application file for complete search history.

(56) References Cited

U.S. PATENT DOCUMENTS

| 2002/0063704 A1* | 5/2002 | Sowizral et al. .............. 345/419 |
| 2002/0089508 A1 | 7/2002 | Sowizral et al. |
| 2008/0278482 A1 | 11/2008 | Farmanbar et al. |

OTHER PUBLICATIONS

Office Action in U.S. Appl. No. 12/125,851, mailed Apr. 20, 2011.

* cited by examiner

*Primary Examiner* — Hau Nguyen
(74) *Attorney, Agent, or Firm* — Artegis Law Group, LLP

(57) ABSTRACT

One embodiment of the present invention sets forth a technique for specifying scene programs, where the effect of executing a particular scene program is to generate a sequence of graphics commands. The application programming interface is extended to include calls used to specify a high-level scene program. Upon receiving a high-level scene program, the graphics driver generates a machine code scene program. When an application program emits a call to execute one or more machine code scene programs, the graphics driver transmits corresponding scene programs execution commands to the graphics pre-processing unit. For each scene program execution command, the graphics pre-processing unit processes instructions, programmatically reconfigures the graphics pipeline based on the execution of the machine code scene program, and launches one or more parallel threads that execute commands within the graphics pipeline. Advantageously, using scene programs, application developers may tailor application programs to more effectively dispatch tasks to the GPU.

20 Claims, 6 Drawing Sheets

SYSTEM AND METHOD FOR ENABLING SCENE PROGRAM FUNCTIONALITY

BACKGROUND OF THE INVENTION

1. Field of the Invention

The present invention relates generally to the field of graphics processing and more specifically to a system and method for enabling scene program functionality.

2. Description of the Related Art

A typical computing system includes a central processing unit (CPU) and a graphics processing unit (GPU). Some GPUs are capable of very high performance using a relatively large number of small, parallel execution threads on dedicated programmable hardware processing units. The specialized design of such GPUs allows these GPUs to perform certain tasks, such as rendering 3-D scenes, much faster than a CPU. However, the specialized design of these GPUs also limits the types of tasks that the GPU can perform. The CPU is typically a more general-purpose processing unit and therefore can perform most tasks. Consequently, the CPU usually executes the overall structure of software application programs and configures the GPUs to perform specific graphics-related tasks in the graphics pipeline.

To fully realize the processing capabilities of advanced GPUs, GPU functionality may be exposed to graphics application developers through an application programming interface (API) of calls and libraries. Among other things, doing so enables graphics application developers to tailor their application programs to optimize the way GPUs process graphics scenes and images. For example, in some GPUs, the API may allow the hardware processing units to be configured as shading engines (e.g., vertex, geometry, and fragment) that include geometry shaders operating in parallel.

More recently, the performance of advanced CPU processing cores has not been increasing as quickly as the performance of advanced GPUs. Consequently, there is a disparity in computing systems between the performance of the CPU processing core that is generating graphics rendering commands and the GPU that is processing these graphics rendering commands. Thus, in some computing systems, the CPU may not be able to generate and transmit graphics rendering commands at the speed with which the GPU can accept and process these commands. As a result, the CPU may become a bottleneck in the execution of the graphics calls issued by application programs, thereby hindering the performance of the GPU.

In one approach to increasing the performance of CPUs, CPU designers have been attempting to integrate more processing cores into the CPU. However, in current graphics APIs, the interface between the application programs and the GPU is usually single-threaded. In other words, the graphics calls emitted by the application programs are generated and transmitted to the GPU serially. As a result, the application programs cannot take advantage of the additional cores in the CPU to increase the speed at which the CPU generates and transmits graphics rendering commands to the GPU. Consequently, the CPU is still a bottleneck in the graphics pipeline.

As the foregoing illustrates, what is needed in the art is a technique that allows an application program to more effectively dispatch tasks to a GPU.

SUMMARY OF THE INVENTION

One embodiment of the present invention sets forth a method for rendering a graphics scene. The method includes the steps of receiving a call from an application program to execute one or more instances of a first scene program, wherein each instance of the first scene program is associated with a sequence of graphics commands, identifying a machine code version of the first scene program and a corresponding high-level version of the first scene program, determining an execution order of the one or more instances of the first scene program based on state information associated with the high-level version of the first scene program, and launching one or more threads for executing one or more instances of the machine code versions of the first scene program.

One advantage of the disclosed method is that high-level scene programs and corresponding machine code scene programs allow application developers to leverage the API to offload graphics processing tasks from the CPU to the graphics processing subsystem. Advantageously, calling machine code scene programs mitigates the serialized nature of the API and, therefore, reduces the likelihood of the CPU creating a bottleneck in the graphics pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
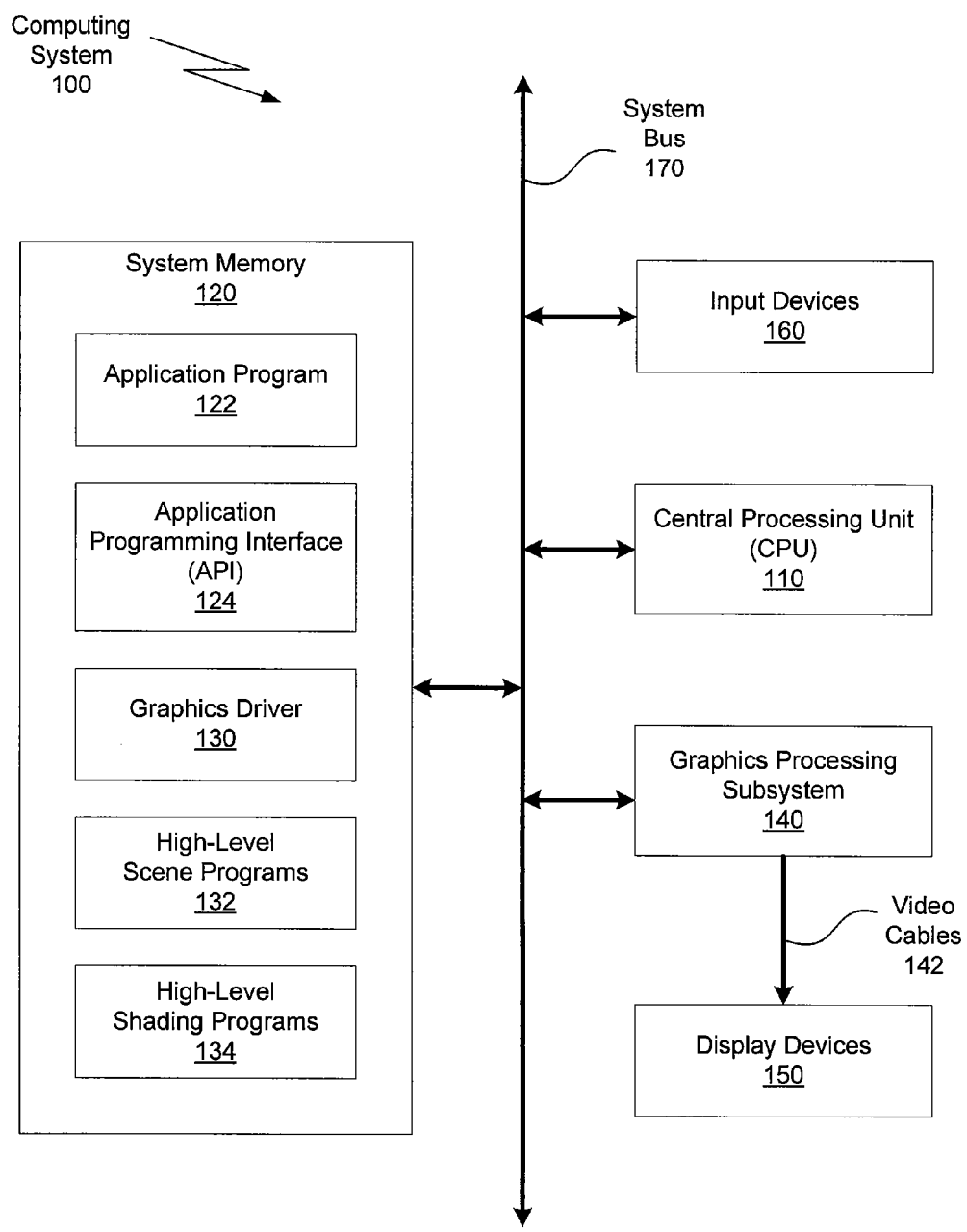
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a system bus 170, a central processing unit (CPU) 110, input devices 160, a system memory 120, a graphics processing subsystem 140, video cables 142, and display devices 150. In alternate embodiments, the CPU 110, portions of the graphics processing subsystem 140, the system bus 170, or any combination thereof, may be integrated into a single processing unit. Further, the functionality of the graphics processing subsystem 140 may be included in a chipset or in some other type of special purpose processing unit or co-processor.

As shown, the CPU 110 connects to the input devices 160, the system memory 120, and the graphics processing subsystem 140 via the system bus 170. In alternate embodiments, the system memory 120 may connect directly to the CPU 110. The CPU 110 receives user input from the input devices 160, executes programming instructions stored in the system memory 120, operates on data stored in the system memory 120, and configures the graphics processing subsystem 140 to perform specific tasks in the graphics pipeline. The system memory 120 typically includes dynamic random access memory (DRAM) used to store programming instructions and data for processing by the CPU 110 and the graphics processing subsystem 140. The graphics processing subsystem 140 receives instructions that are transmitted by the CPU 110 and processes the instructions in order to render and display graphics images on the display devices 150.

The system memory 120 includes one or more application programs 122, an application programming interface (API) 124, high-level shading programs 134, high-level scene programs 132, and a graphics driver 130. The application programs 122 generate calls to the API 124 in order to produce a desired set of results, typically in the form of a sequence of graphics images. The application programs 122 also transmit one or more high-level shading programs 134 and one or more high-level scene programs 132 to the API 124 for processing within the graphics driver 130. The high-level shading programs 134 are typically source code text of high-level programming instructions that are designed to operate on one or more shaders within the graphics processing subsystem 140. Similarly, the high-level scene programs 132 are typically source code text of high-level programming instructions that are designed to programmatically execute and operate on various components within the graphics processing subsystem 140. The API 124 functionality is typically implemented within the graphics driver 130.

The high-level scene programs 132 are specified using a text language that includes constructs such as looping and branching. Further, each high-level scene programs 132 includes one or more calls to the API 124. The API 124 includes a variety of calls designed to specify the high-level scene programs 132 and to execute instances of the machine code versions of the high-level scene programs 132. For example, the API 124 may include calls used to specify import state and export state for the high-level scene programs 132. Moreover, the API 124 may include calls to execute one or more instances of one or more of the machine code versions of one or more high-level scene programs 132, where the export state from each instance is to be applied to the current state before the next instance is executed. The state may include a variety of settings that affect the rendering and display of images, such as the current color and texture. For each high-level scene program 132, defining the import state and the export state encapsulates the effects of executing instances of the machine code version of that particular high-level scene program 132. Advantageously, encapsulating the state for each high-level scene program 132 enables the graphics driver 130 to determine any dependencies between the machine code versions of the high-level scene programs 132.

Figure 2:
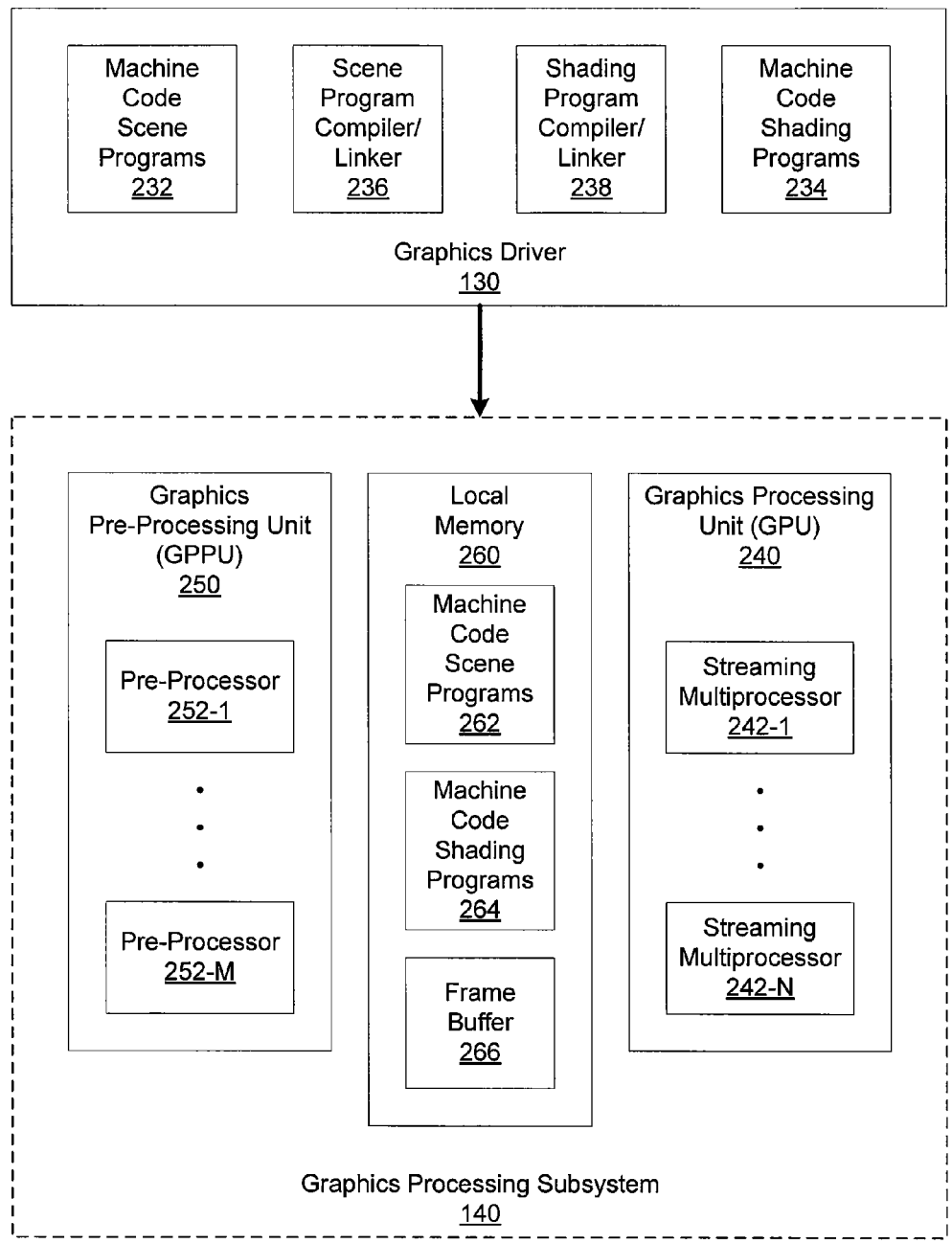
FIG. 2 is a conceptual diagram of the graphics driver and the graphics processing subsystem of FIG. 1, according to one embodiment of the invention.

As discussed in greater detail in conjunction with FIG. 2, after evaluating the dependencies, the graphics driver 130 determines whether to execute one or more instances of the machine code versions of one or more high-level scene programs 132 in parallel, serially, or a combination thereof. TABLE 1 sets forth some examples of API calls that may be used to specify or call high-level scene programs.

TABLE 1

| Type | Function Name | Arguments |
|------|---------------|-----------|
| GLhandle | glCreateSceneProgram | (const char *programText); |
| void | glSetImportState | (const char *imports); |
| void | glSetExportState | (const char *exports); |
| void | glCallSceneProgram | (GLhandle program); |
| void | glCallScenePrograms | (GLuint cout, GLhandle *programs); |

The API 124 also enables each high-level scene program 132 to hierarchically call instances of machine code scene programs. Components within the graphics processing subsystem 140 use the import state and the export state of the machine code scene programs to determine any dependencies. Components within the graphics processing subsystem 140 then use the dependencies to schedule the execution of the hierarchically-called instances of the machine code scene programs in parallel, serially, or a combination thereof.

In alternative embodiments, the high-level scene programs 132 may be generated using any technically feasible method. For example, one or more of the high-level scene programs 132 may include exclusively static constructs. Such a high-level scene program 132 may be generated using a prior art API conversion. In the API conversion technique, one or more API calls may be recorded and, subsequently, a conversion program may convert each API call into a corresponding line of text.

The graphics processing subsystem 140 executes the commands transmitted by the graphics driver 130 to render graphics data and images. These commands may include calls to execute instances of machine code scene programs and calls to reconfigure the graphics processing subsystem 140 to implement machine code shading programs. Subsequently, the graphics processing subsystem 140 may display certain graphics images on the display devices 150 that are connected to the graphics processing subsystem 140 via the video cables 142. Each display device 150 is an output device capable of emitting a visual image corresponding to an input graphics image. For example, each display device 150 may be built using a liquid crystal display (LCD), a cathode ray tube (CRT) monitor, or any other suitable display system.

FIG. 2 is a conceptual diagram of the graphics driver 130 and the graphics processing subsystem 140 of FIG. 1, according to one embodiment of the invention. Again, the graphics driver 130 processes the high-level scene programs 132 and the high-level shading programs 134 transmitted by the application programs 122. In addition, the graphics driver 130 configures the graphics processing subsystem 140 to implement calls to the API 124 that are emitted by the application programs 122. As shown, the graphics driver 130 includes a shading program compiler/linker 238, machine code shading programs 234, a scene program compiler/linker 236, and machine code scene programs 232. The graphics processing subsystem 140 includes a graphics processing unit (GPU) 240, a graphics pre-processing unit (GPPU) 250, and a local memory 260.

The graphics driver 130 receives the high-level shading programs 134 (not shown), generates the machine code shading programs 234, and stores the machine code shading programs 234 as machine code shading programs 264 in the local memory 260. The shading program compiler/linker 238 is configured to convert the high-level shading programs 134 into machine code shading programs 234 that are optimized to operate on one or more programmable shading engines within the GPU 240.

In alternate embodiments, the shading program compiler/linker 238 may be configured to convert the high-level shading programs into intermediate assembly language programs and then generate the machine code shading programs based on the assembly language programs. In other embodiments, the shading program compiler/linker 238 may not be included in the graphics driver. Instead, the machine code shading programs 234 may be generated using any technically feasible off-line method and then transmitted to the graphics driver 130 via the system bus 170. Further, in some embodiments, the machine code shading programs may be stored in the system memory 120 or in on-chip GPU memory instead of the local memory 260.

The graphics driver 130 also receives the high-level scene programs 132 (not shown), generates the machine code scene programs 232, and stores the machine code scene programs 232 as machine code scene programs 262 in the local memory 260. The scene program compiler/linker 236 is configured to convert the high-level scene programs 132 into machine code scene programs 232 that are optimized to operate within the GPPU 250.

In some embodiments, the scene program compiler/linker 236 may be configured to convert the high-level scene programs into intermediate assembly language programs and then generate the machine code scene programs based on the assembly language programs. In other embodiments, the scene program compiler/linker 236 may not be included in the graphics driver. Instead, the machine code scene programs 232 may be generated using any technically feasible off-line method and then transmitted to the graphics driver 130 via the system bus 170. Further, in some embodiments, the machine code scene programs may be stored in the system memory 120 or in on-chip GPPU memory instead of the local memory 260.

The graphics driver 130 is also configured to receive calls to the API 124 that are emitted from the application programs 122. These calls may include calls to execute one or more instances of one or more machine code scene programs 262. Upon receiving such a call, the graphics driver 130 evaluates the import state and export state of the corresponding high-level scene programs 132 to identify any dependencies amongst the instances of the applicable machine code scene programs 262. After identifying any such dependencies, the graphics driver 130 determines which, if any, instances of the machine code scene programs 262 may be executed in parallel without corrupting the execution of the application program 122. For example, the machine code version of any high-level scene program 132 that does not specify either an import state or an export state may be executed in parallel.

Once that determination is made, the graphics driver 130 transmits one or more execution threads in parallel, serially, or any combination thereof, to the GPPU 250. Each of these threads includes one scene program execution command that executes a particular instance of a particular machine code scene program 262. Together, the threads execute all of the instances of the machine code scene program 262 that are specified in the call. Advantageously, although the API 124 between the application programs 122 and the graphics processing subsystem 140 is single-threaded, when a particular API 124 call indicates that one or more instances of one or more machine code scene programs 262 should be executed, the graphics driver 130 may launch multiple parallel execution threads to achieve such an outcome.

In alternate embodiments, the graphics driver 130 may be configured to determine and use the optimal resource available in the computing system 100 for compiling scene programs and executing instances of machine code scene programs. For example, some graphics processing subsystems may not include a graphics pre-processing unit that is capable of implementing the high-level instruction set that may be used by the scene programs. If the graphics driver does not identify an appropriate resource within the graphics process subsystem to implement the scene programs, then the graphics driver may compile the high-level scene programs to machine code scene programs targeted for execution by the CPU. Subsequently, the graphics driver may attempt to configure an available core of the CPU to receive the scene program execution commands. If no core is available, then the graphics driver may process the scene program execution commands itself. In this fashion, the graphics driver may be configured to take advantage of whatever hardware exists in a computing system 100 to implement the scene program functionality.

The graphics pre-processing unit (GPPU) 250 includes one or more pre-processors 252. Each of the pre-processors 252 is capable of processing one or more execution threads concurrently. Further, each of the pre-processors 252 implements a high-level instruction set that enables the pre-processor 252 to execute instances of the machine code scene programs 262. The instruction set supports constructs such as branching, control, calls to machine code shading programs 264, hierarchical calls to machine code scene programs 262, and the like. The GPPU 250 uses the pre-processors 252 to execute the instructions in the machine code scene programs 262. Moreover, the GPPU 250 is configured to identify and exploit opportunities to concurrently execute the instructions in the machine code scene program 262 in any technically feasible fashion. The GPPU 250 may be provided with any amount of local memory 260 and may use local memory 260 and/or system memory 120, in any combination, for memory operations.

Upon receiving a scene program execution command, the GPPU 250 executes an instance of the specified machine code scene program 262. In so doing, the GPPU 250 executes any number of scene program instructions within the GPPU 250, and launches any number of threads in parallel, serially, or any combination thereof, to execute graphics commands within the graphics pipeline. Further, based on the execution of the instances of the machine code scene program 262, the GPPU 250 may conditionally reconfigure the graphics pipeline. For example, the GPPU may evaluate the import state to dynamically select a particular vertex shading program, configure components within the GPU as a vertex shading engine that implements the selected vertex shading program, and process a set of vertices using the vertex shading engine.

As previously described herein, the API 124 includes constructs used to define the import state and export state for each machine code scene program 262. The GPPU 250 uses the import state in conjunction with a default state to execute the instructions in the machine code scene program 262 within a known environment. For example, the import state and export state calls may enable one instance of a particular machine code scene program 262 to set up the state for a subsequent instance of another machine code scene program 262. Furthermore, defining execution state for each machine code scene program 262 enables the GPPU 250 to identify any dependencies amongst instances of machine code scene program 262 that are called hierarchically during the execution of a particular machine code scene program 262. After identifying any such dependencies, the GPPU 250 determines which, if any, of these child instances are amenable to being executed in parallel without corrupting the execution of the parent machine code scene program 262. The GPPU 250 then spawns one or more execution threads in parallel, serially, or a combination thereof, to execute the child instances of the machine code scene programs 262.

The GPU 240 includes one or more streaming multiprocessors 242. Each of the streaming multiprocessors 242 is capable of executing a relatively large number of threads concurrently. Advantageously, each of the streaming multiprocessors 242 can be programmed to execute processing tasks relating to a wide variety of applications, including but not limited to linear and nonlinear data transforms, filtering of video and/or audio data, modeling operations (e.g. applying of physics to determine position, velocity, and other attributes of objects), and so on. Furthermore, each of the streaming multiprocessors 242 may be configured as a programmable shading engine that can execute a particular machine code shading program 264 to perform image rendering operations. The GPU 240 may be provided with any amount of local memory 260 and may use local memory 260 and/or system memory 120, in any combination, for memory operations.

The local memory 260 is used to store data and programming used by the graphics processing subsystem 140 and may include machine code shading programs 264, machine code scene programs 262, and a frame buffer 266. The machine code shading programs 264 and the machine code scene programs 262 may be transmitted from the graphics driver 130 to the local memory 260 via the system bus 170 of FIG. 1. The machine code shading programs 264 may include a machine code vertex shading program, a machine code geometry shading program, a machine code fragment shading program, or any number of variations of each. The frame buffer 266 stores data for at least one two-dimensional surface that may be used to drive the display devices 150 (not shown). Furthermore, the frame buffer 266 may include more than one two-dimensional surface so that the GPU 240 can render to one two-dimensional surface, while a second two-dimensional surface is used to drive the display devices 150.

Figure 3:
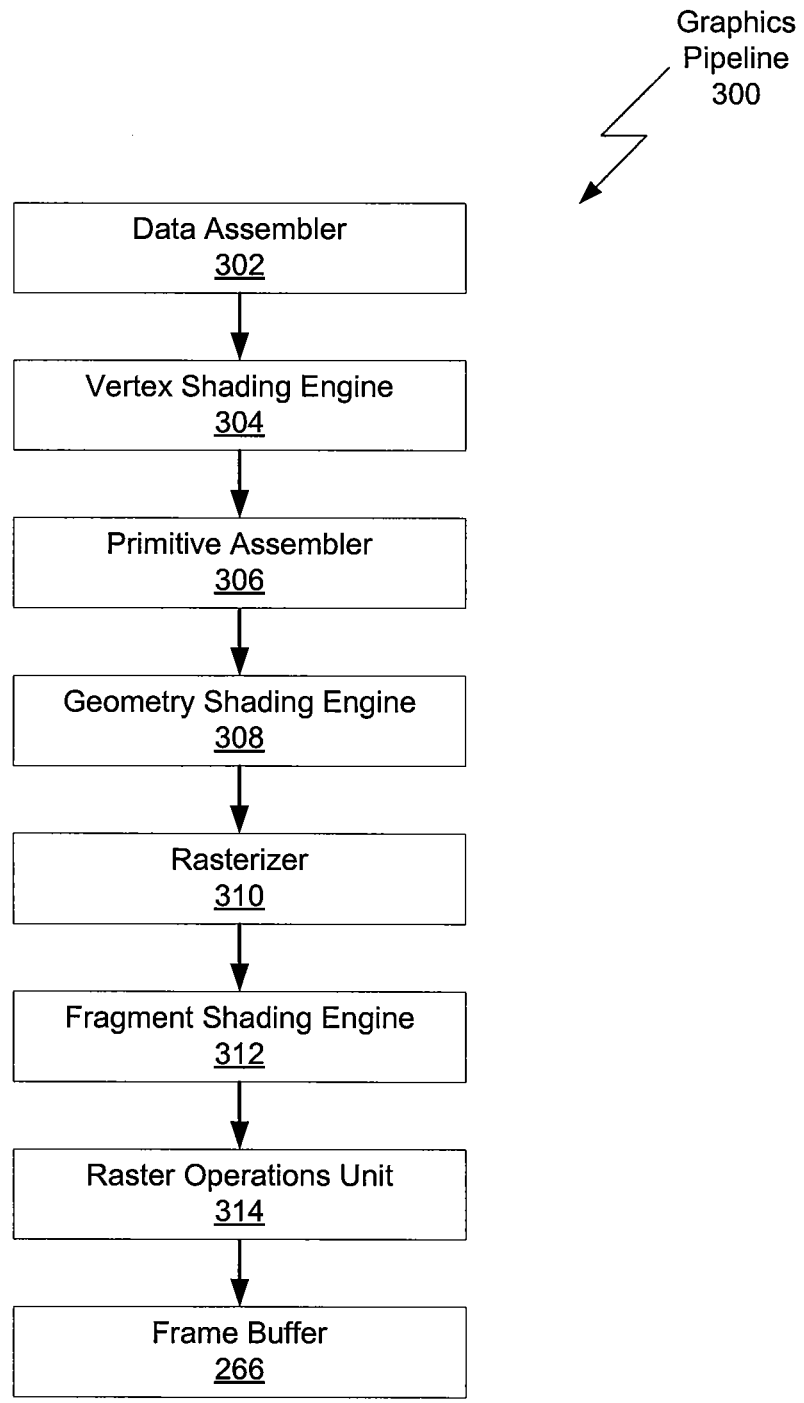
FIG. 3 is a conceptual diagram of a programmable graphics pipeline residing within the GPU of FIG. 2, according to one embodiment of the invention.

FIG. 3 is a conceptual diagram of a programmable graphics pipeline 300 residing within the GPU 240 of FIG. 2, according to one embodiment of the invention. The graphics pipeline 300 is configured to transform 3-D images into 2-D images. Again, the programmable graphics pipeline 300 may be configured by the graphics driver 130 or dynamically configured by the GPPU 250 during the execution of the machine code scene programs 262. As shown, the graphics pipeline 300 includes a data assembler 302, a vertex shading engine 304, a primitive assembler 306, a geometry shading engine 308, a rasterizer 310, a fragment shading engine 312, a raster operations unit 314, and the frame buffer 266.

The data assembler 302 is a fixed-function unit that collects vertex data from the application program 122 for high-order surfaces, primitives, and the like, and passes the vertex data to the vertex shading engine 304. The data assembler 302 may gather data from buffers stored within the system memory 120 and the local memory 260 as well as from API calls from the application program 122 used to specify vertex attributes. The vertex shading engine 304 is a programmable execution unit, such as the streaming multiprocessor 242-1, that is configured to execute a machine code vertex shading program, processing vertex data as specified by the vertex shading program. For example, the vertex shading engine 304 may be programmed to transform the vertex data from an object-based coordinate representation (object space) to an alternatively based coordinate system such as world space or normalized device coordinates (NDC) space. The vertex shading engine 304 may access data that is stored in local memory 260.

The primitive assembler 306 is a fixed-function unit that receives processed vertex data from the vertex shading engine 304 and constructs graphics primitives, e.g., points, lines, triangles, or the like, for processing by the geometry shading engine 308. In alternative embodiments, a second primitive assembler (not shown) may be included subsequent to the geometry shading engine 308 in the data flow through the GPU 240. The geometry shading engine 308 is a programmable execution unit, such as the streaming multiprocessor 242-1, that is configured to execute a machine code geometry shading program, processing graphics primitives received from the primitive assembler 306 as specified by the geometry shading program. For example, in addition to well-known per-primitive operations such as clipping, the geometry shading engine 308 may be programmed to generate one or more new graphics primitives and calculate parameters, such as plane equation coefficients, that are used to rasterize the new graphics primitives. The geometry shading engine 308 may access data that is stored in the local memory 260. The geometry shading engine 308 outputs the parameters and new graphics primitives to the rasterizer 310. The rasterizer 310 is a fixed-function unit that scans the new graphics primitives and outputs fragments, each containing fragment data, which may include raster position, depth or interpolated vertex attributes, such as texture coordinates and opacity, to the fragment shading engine 312.

The fragment shading engine 312 is a programmable execution unit, such as the streaming multiprocessor 242-1, that is configured to execute a machine code fragment shading program, processing fragments received from the rasterizer 310 as specified by the machine code fragment shading program. For example, the fragment shading engine 312 may be programmed to perform operations such as perspective correction, shading, blending, and the like, to produce shaded fragments that are output to the raster operations unit 314. The fragment shading engine 312 may access data that is stored in buffers in the local memory 260. The raster operations unit 314 optionally performs fixed-function computations such as near and far plane clipping and raster operations, such as stencil, z test, blending and the like, and outputs pixel data as processed graphics data for storage in a buffer in the local memory 260.

Upon receiving a single call from an application program 122 to execute instances of machine-level scene programs 262, the graphics driver 130 may spawn multiple parallel threads to be processed by the GPPU 250. Further, for each of these threads, the GPPU 250 may spawn multiple parallel threads for execution within the GPU 240. In this fashion, the scene program functionality optimizes the graphics pipeline 300 that exists within the GPU 240. Moreover, the programmable domain existing inside the GPU 240 is further abstracted to include the programmable domain existing inside the GPPU 250. Using the machine code scene programs 262 and the machine code shading programs 264, the graphics pipeline 300 may be dynamically reconfigured within the graphics processing subsystem 140. Enabling dynamic reconfiguration of the graphics pipeline 300, without intervention from the CPU 110, further optimizes the performance of the computing system 100.

Figure 4:
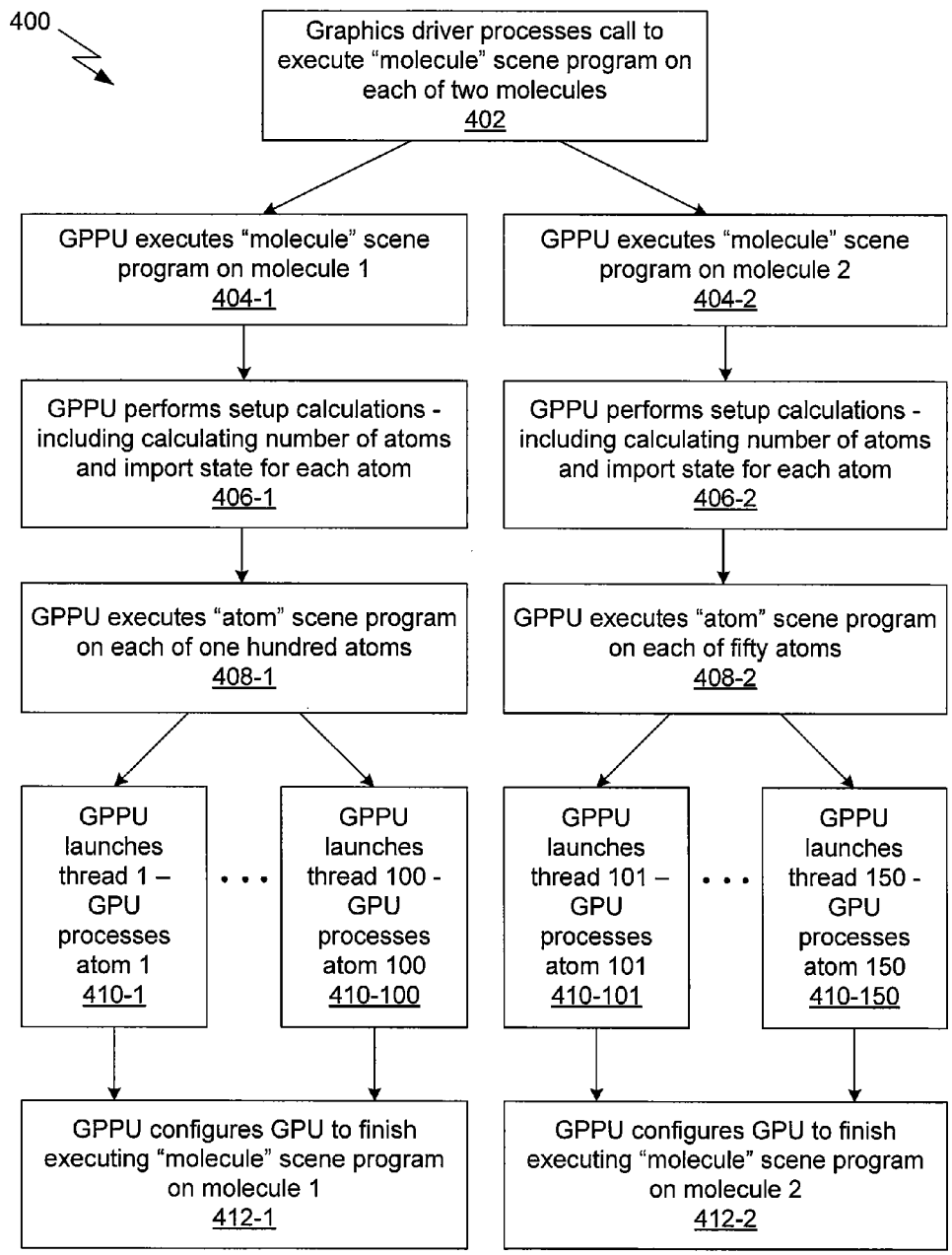
FIG. 4 is a flow diagram of method steps for executing two instances of an exemplary scene program, according to one embodiment of the invention.

FIG. 4 is a flow diagram of method steps for executing two instances of an exemplary scene program, according to one embodiment of the invention. Although the method steps are described in conjunction with the systems for FIGS. 1-3, persons skilled in the art will understand that any system that performs the method steps, in any order, is within the scope of the invention. The following is an example of executing two instances of a first machine code scene program 262 in which a particular biological molecule with multiple associated atoms is rendered and displayed by the display devices 150.

As shown, the method 400 begins at step 402, where the graphics driver 130 receives and processes a call from an application program 122 to execute two instances of a first machine code scene program 262 that renders and displays a molecule (i.e., the "molecule" machine code scene program). Each instance is configured to operate on a different molecule. The graphics driver 130 evaluates the import state and the export state of the "molecule" high-level scene program and determines that the two instances of the "molecule" machine code scene program have no dependencies. Subsequently, the graphics driver 130 launches two parallel execution threads for processing by the GPPU 250. Each of these threads contains a scene program execution command that executes the "molecule" machine code scene program on a different one of the two molecules. At step 404, the GPPU 250 concurrently processes the two threads launched by the graphics driver 130. Thus, the GPPU 250 begins executing two instances of the "molecule" machine code scene program—the first instance operating on molecule one and the second instance operating on molecule two.

At step 406, the GPPU 250 performs setup calculations as specified by the instructions in the "molecule" machine code scene program. For each molecule, these calculations include computing the number and type of atoms included in the molecule, and the import state for rendering and displaying each of these atoms. For example, for a particular atom, the import state may include the location and the color to display for the atom. Again, the GPPU 250 concurrently processes the two molecules. As part of step 406-1, the GPPU 250 may determine that the molecule one includes one hundred atoms. Similarly, as part of step 406-2, the GPPU 250 may determine that the molecule two includes fifty atoms. At step 408, the GPPU 250 evaluates the import state and export state a second machine code scene program 262 that renders and displays an atom (i.e., the "atom" machine code scene program). The GPPU 250 determines that the instances of the "atom" machine code scene program have no dependencies. Subsequently, as part of step 408-1, the GPPU 250 spawns one hundred parallel threads that execute one hundred instances of the "atom" machine code scene program, one instance on each of the atoms in molecule one. Concurrently to step 408-1, as part of step 408-2, the GPPU 250 spawns fifty parallel threads that execute fifty instances of the "atom" machine code scene program, one instance on each the atoms in molecule two. Again, each of the instances includes a distinct import state that defines per-atom information, such as the location and the color. Based on the execution of the instances of the "atom" machine code scene program, the GPPU 250 conditionally and dynamically configures the graphics pipeline 300 within the GPU 240 as one or more shading engines.

At step 410, the GPPU 250 launches one hundred and fifty parallel threads for processing by the GPU 240. Each of these threads executes "atom" graphics commands within the graphics pipeline 300 of the GPU 240, rendering and displaying a particular atom that is included in either molecule one or molecule two. At step 412-1, the thread associated with molecule one within the GPPU 250 waits for the one hundred parallel threads that are processing the atoms included in molecule one to complete executing in the GPU 240. Then, the GPPU 250 continues processing molecule one, executing instructions specified by the "molecule" machine code scene program. Based on the execution of these instructions, the GPPU 250 reconfigures the graphics pipeline 300 within the GPU 240. The GPPU 250 then launches a thread for processing molecule-level graphics commands on the GPU 240. The execution of this thread on the GPU 240 completes the rendering and display of molecule one.

Concurrently to step 412-1, at step 412-2, the thread associated with molecule two within the GPPU 250 waits for the fifty parallel threads that are processing the atoms included in molecule two to complete executing in the GPU 240. Then, the GPPU 250 continues processing molecule two, executing instructions specified by the "molecule" machine code scene program. Based on the execution of these instructions, the GPPU 250 reconfigures the graphics pipeline 300 within the GPU 240. The GPPU 250 then launches a thread for processing molecule-level graphics commands on the GPU 240. The execution of this thread on the GPU 240 completes the rendering and display of molecule two. Again, steps 412-1 and 412-2 are conducted using parallel threads within the GPPU 250 and parallel threads within the GPU 240.

Figure 5:
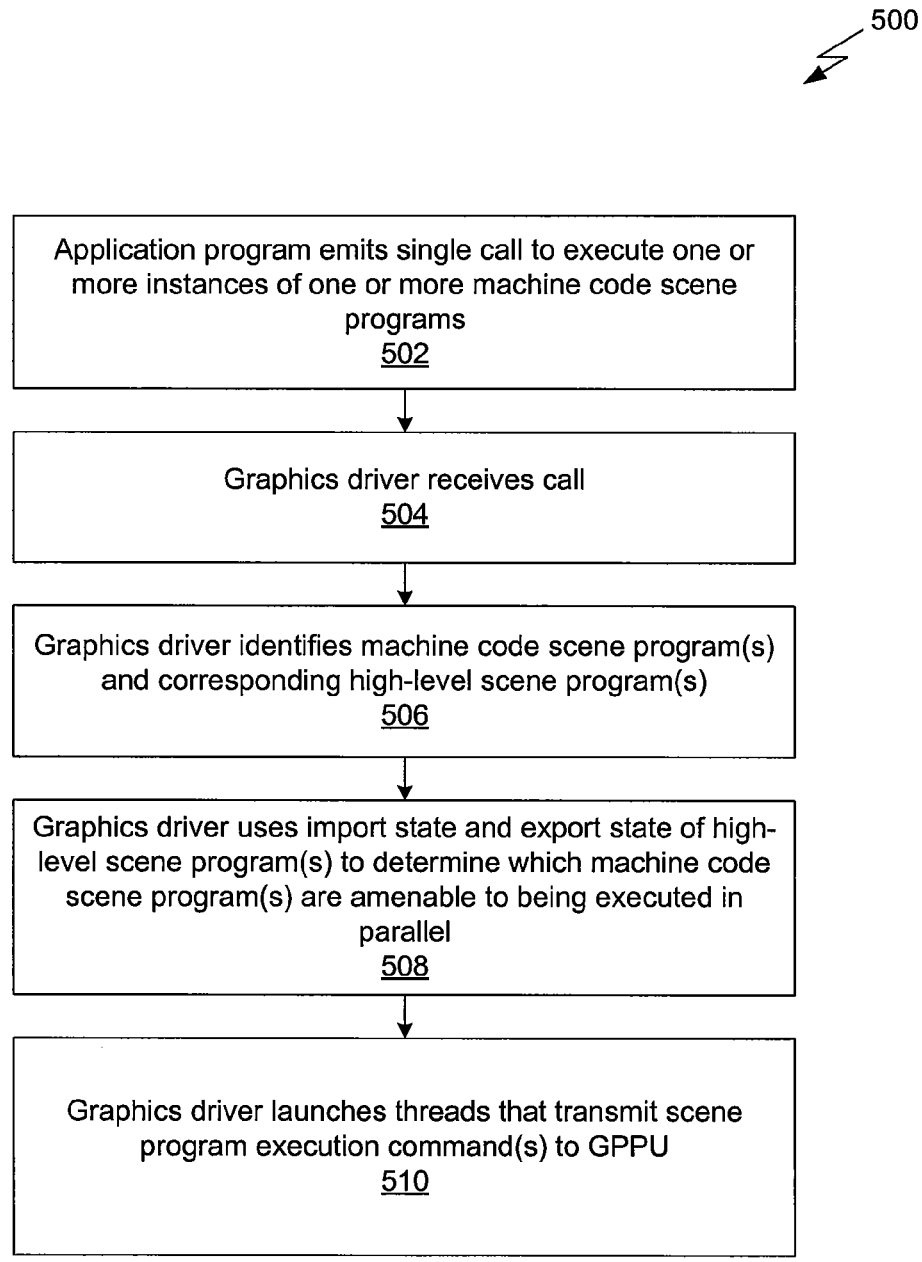
FIG. 5 is a flow diagram of method steps for processing an application programming interface call to execute one or more machine code scene programs, according to one embodiment of the invention.

FIG. 5 is a flow diagram of method steps for processing an application programming interface 124 call to execute one or more machine code scene programs 262, according to one embodiment of the invention. Although the method steps are described in conjunction with the systems for FIGS. 1-3, persons skilled in the art will understand that any system that performs the method steps, in any order, is within the scope of the invention.

As shown, the method 500 begins at step 502, where the application program 122 emits a single call to execute one or more instances of one or more machine code scene programs 262. At step 504, the graphics driver 130 receives the call. At step 506, the graphics driver 130 identifies the one or more machine code scene programs 262 specified in the single call, received at step 502, and the one or more corresponding high-level scene programs 132. The graphics driver 130 may accomplish this identification in any technically feasible manner. For example, the graphics driver may identify the machine code scene programs and the high-level scene programs by name, identifier, or pointers to memory.

At step 508, the graphics driver 130 uses the import state and the export state of the identified high-level scene programs 132 to determine any dependencies amongst the corresponding machine code scene programs 262. As previously described herein, the graphics driver 130 is configured to schedule the execution of the instances of the machine code scene program 262 to exploit any opportunities for concurrency, while ensuring the integrity of the graphics processing of the application program 122. At step 510, the graphics driver 130 launches one or more execution threads in parallel, serially, or any combination thereof, for processing by the GPPU 250. Each of these execution threads includes one scene program execution command that executes a specific instance of a particular machine code scene program 262. Together, these threads configure the GPPU 250 to execute all the instances of the machine code scene programs 262 specified in the single call that was received by the graphics driver 130 at step 502.

Figure 6:
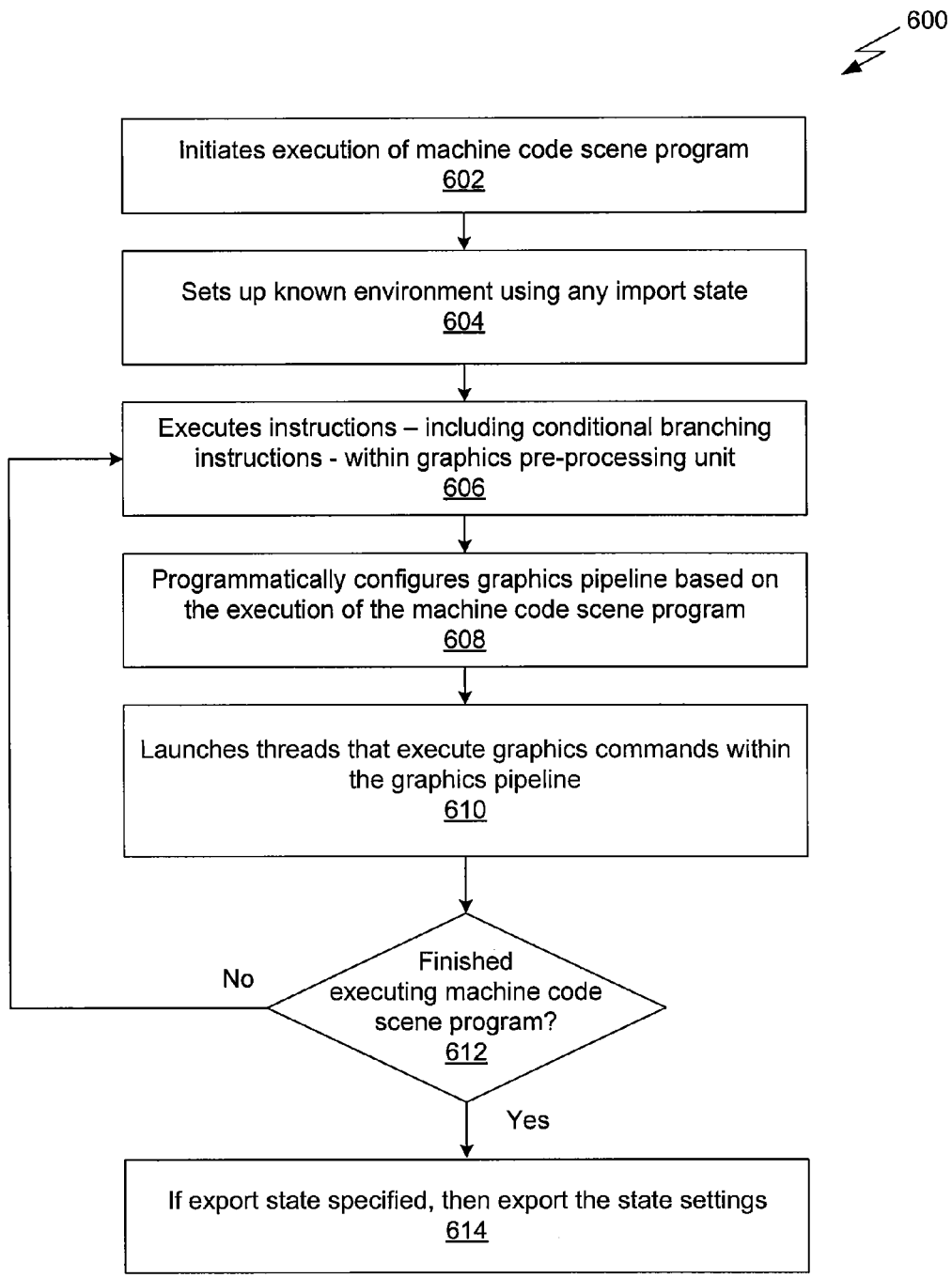
FIG. 6 is a flow diagram of method steps for processing a scene program execution command, according to one embodiment of the invention.

FIG. 6 is a flow diagram of method steps for processing a scene program execution command, according to one embodiment of the invention. Although the method steps are described in conjunction with the systems for FIGS. 1-3, persons skilled in the art will understand that any system that performs the method steps, in any order, is within the scope of the invention.

As shown, the method 600 begins at step 602, where the GPPU 250 receives a scene program execution command and initiates the execution of an instance of a specified machine code scene program 262. At step 604, the GPPU 250 uses the import state of the machine code scene program 262 in conjunction with a default state to create a known environment within which to execute the instructions specified by the machine code scene program 262. At step 606, the GPPU 250 executes one or more instructions within the GPPU 250 as specified by the machine code scene program 262. As detailed above in conjunction with FIG. 1, these instructions may include conditional, branching, hierarchical calls to execute one or more instances of machine code scene programs 262, and the like. At step 608, the GPPU 250 programmatically configures the graphics pipeline 300 within the GPU 240 based on the execution of the machine code scene program 262. At step 610, the GPPU 250 launches one or more execution threads in parallel, serially, or any combination thereof, for processing by the GPU 240. Each of these threads executes graphics commands within the graphics pipeline 300.

At step 612, if the GPPU 250 determines that the instance of the machine code scene program 262 specified in step 602 has not finished executing, then the method 600 returns to step 606. The method continues in this fashion, looping through steps 606-612, until the GPPU 250 finishes executing the instance of the machine code scene program 262 specified in step 602. If, at step 612, the GPPU 250 determines that the instance of the machine code scene program 262 specified in step 602 has finished executing, then the method 600 proceeds to step 614. At step 614, if the machine code scene program 262 defines an export state, then the GPPU 250 exports the state settings, thereby enabling subsequent rendering programs to use the export state.

Again, as detailed above in conjunction with FIG. 2, the GPPU 250 is configured to identify and exploit opportunities to execute the instructions in the machine code scene program 262 using parallel execution threads. Consequently, throughout the steps 602-614 of method 600, the GPPU 250 may execute any number of parallel threads and any number of serial threads.

In sum, scene programs provide a new mechanism for application developers to efficiently specify and dispatch sequences of graphics tasks to the graphics processing subsystem. In one embodiment, the application programming interface (API), the graphics driver, and the graphics processing subsystem are enhanced to enable the specification and execution of scene programs. The API is extended to include calls that are used to specify and invoke high-level scene programs. Some of the capabilities that these calls enable include branch, control, and hierarchical execution of scene programs, import state specification, and export state specification.

Upon receiving a high-level scene program, the graphics driver generates a machine code version of the scene program and transmits this program to the local memory within the graphics processing subsystem. When the application program emits a call to execute one or more machine code scene programs, the graphics driver evaluates the import state and the export state to identify opportunities for parallelism within the graphics pre-processing unit. The graphics driver then dispatches one or more threads, each containing scene program execution commands, to the graphics pre-processing unit within the graphics processing subsystem for execution. Upon receiving a scene program execution command, the graphics pre-processing unit executes the appropriate machine code scene program. While executing the machine code scene program, the graphics pre-processing unit may programmatically reconfigure the graphics pipeline based on the execution of the machine code scene program and launch one or more parallel threads that execute graphics commands within the graphics pipeline. Further, still while executing the machine code scene program, the graphics pre-processing unit may hierarchically execute instances of machine code scene programs. Again, the graphics pre-processing unit uses the import states and the export states to identify opportunities for parallelism within both the graphics pre-processing unit and the GPU.

High-level scene programs and the corresponding machine code scene programs allow application developers to leverage the API to offload graphics processing tasks from the CPU to the graphics processing subsystem. Advantageously, calling machine code scene programs mitigates the serialized nature of the API and, therefore, reduces the likelihood of the CPU creating a bottleneck in the graphics pipeline. Furthermore, since high-level scene programs may include branching and control instructions, each high-level scene program may be used to implement a variety of algorithms that require dynamic reconfiguring of the graphics pipeline. Finally, specifying import states and export states within high-level scene programs allows the graphics driver and graphics pre-processing unit to identify and exploit opportunities for executing instances of machine code scene programs in parallel, thereby further optimizing the graphics pipeline.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the above examples, embodiments, and drawings should not be deemed to be the only embodiments, and are presented to illustrate the flexibility and advantages of the present invention as defined by the following claims.

We claim:

1. A computer-implemented method for rendering a graphics scene, the method comprising:
  receiving a first thread launched to execute an instance of a machine code version of a parent scene program;
  receiving a second thread launched to execute an instance of a machine code version of a parent scene program;
  in response to executing at least one instruction associated with the first thread, executing one or more threads that each executes one or more instructions of the instance of the machine code version of the parent scene program associated with the first thread;
  in response to executing at least one instruction associated with the second thread, executing one or more threads that each executes one or more instructions of the instance of the machine code version of the parent scene program associated with the second thread;
  in response to executing at least one instruction of the instance of the machine code version of the parent scene program associated with the first thread, executing a first set of graphics commands on a graphics processing unit; and in response to executing at least one instruction of the instance of the machine code version of the parent scene program associated with the second thread, executing a second set of graphics commands on a graphics processing unit.

2. The computer-implemented method of claim 1, wherein the machine code version of the parent scene program associated with the first thread is the same as the machine code version of the parent scene program associated with the second thread.

3. The computer-implemented method of claim 2, wherein the instance of the machine code version of the parent scene program associated with the first thread is different than the instance of the machine code version of the parent scene program associated with the second thread.

4. The computer-implemented method of claim 1, wherein the machine code version of the parent scene program associated with the first thread is different than the machine code version of the parent scene program associated with the second thread.

5. The computer-implemented method of claim 1, wherein executing a first set of graphics commands on a graphics processing unit comprises the step of generating one or more threads that each execute one or more graphics commands on the graphics processing unit.

6. The computer-implemented method of claim 5, wherein at least one of the one or more threads executes a shading program on the graphics processing unit.

7. The computer-implemented method of claim 5, wherein two or more of the one or more threads are configured to execute on the graphics processing unit in parallel.

8. The computer-implemented method of claim 5, wherein at least two of the one or more threads are configured to execute serially on the graphics processing unit.

9. The computer-implemented method of claim 1, wherein the step of executing one or more threads that each executes one or more instructions of the instance of the machine code version of the parent scene program associated with the first thread comprises executing one or more instances of machine code versions of one or more children scene programs.

10. The computer-implemented method of claim 9, wherein an execution order of the one or more instances of machine code versions of one or more children scene programs is based on import and export state information related to the one or more instances of the machine code versions of the one or more child scene programs.

11. The computer-implemented method of claim 10 wherein two or more of the one or more instances of the machine code versions of the one or more child scene programs are configured to execute in parallel.

12. The computer-implemented method of claim 11, wherein two or more of the one or more instances of the machine code versions of the one or more child scene programs are configured to execute serially.

13. The computer-implemented method of claim 12, wherein executing one or more instances of machine code versions of one or more children scene programs comprises executing one or more graphics commands on the graphics processing unit.

14. The computer-implemented method of claim 13, wherein a plurality of the one or more graphics commands is included in a shading program.

15. A graphics subsystem, comprising:
a graphics processing unit; and
a graphics pre-processing unit coupled to the graphics pre-processing unit and configured to:
receive a first thread launched to execute an instance of a machine code version of a parent scene program,
receive a second thread launched to execute an instance of a machine code version of a parent scene program,
in response to executing at least one instruction associated with the first thread, execute one or more threads that each executes one or more instructions of the instance of the machine code version of the parent scene program associated with the first thread,
in response to executing at least one instruction associated with the second thread, execute one or more threads that each executes one or more instructions of the instance of the machine code version of the parent scene program associated with the second thread,
in response to executing at least one instruction of the instance of the machine code version of the parent scene program associated with the first thread, execute a first set of graphics commands on the graphics processing unit, and
in response to executing at least one instruction of the instance of the machine code version of the parent scene program associated with the second thread, execute a second set of graphics commands on the graphics processing unit.

16. The graphics subsystem of claim 15, wherein the graphics pre-processing unit comprises a core of a central processing unit.

17. The graphics subsystem of claim 15, wherein, in executing a first set of graphics commands on the graphics processing unit, the graphics pre-processing unit is configured to generate one or more threads that each execute one or more graphics commands on the graphics processing unit.

18. The graphics subsystem of claim 15, wherein, in executing one or more threads that each executes one or more instructions of the instance of the machine code version of the parent scene program associated with the first thread, the graphics pre-processing unit is configured to execute one or more instances of machine code versions of one or more children scene programs.

19. The graphics subsystem of claim 18, wherein an execution order of the one or more instances of machine code versions of one or more children scene programs is based on import and export state information related to the one or more instances of the machine code versions of the one or more child scene programs.

20. The graphics subsystem of claim 18, wherein in executing one or more instances of machine code versions of one or more children scene programs, the graphics pre-processing unit is configured to execute one or more graphics commands on the graphics processing unit.

* * * * *